US012646714B2

(12) United States Patent
Zhou

(10) Patent No.: US 12,646,714 B2
(45) Date of Patent: Jun. 2, 2026

(54) LITHIUM SUPPLEMENTING MATERIAL AND POSITIVE ELECTRODE CONTAINING SAME

(71) Applicant: NINGDE AMPEREX TECHNOLOGY LIMITED, Ningde (CN)

(72) Inventor: Molin Zhou, Ningde (CN)

(73) Assignee: Ningde Amperex Technology Limited, Ningde (CN)

( * ) Notice: Subject to any disclaimer, the term of this patent is extended or adjusted under 35 U.S.C. 154(b) by 790 days.

(21) Appl. No.: 17/700,886

(22) Filed: Mar. 22, 2022

(65) Prior Publication Data

US 2022/0216471 A1    Jul. 7, 2022

Related U.S. Application Data

(63) Continuation of application No. PCT/CN2019/122058, filed on Nov. 29, 2019.

(30) Foreign Application Priority Data

Nov. 4, 2019    (CN) .......................... 201911066786.6

(51) Int. Cl.
*H01M 4/525*        (2010.01)
*H01M 4/505*        (2010.01)
            (Continued)

(52) U.S. Cl.
CPC ........... *H01M 4/525* (2013.01); *H01M 4/505* (2013.01); *H01M 4/5825* (2013.01);
            (Continued)

(58) Field of Classification Search
CPC .... H01M 4/525; H01M 4/505; H01M 4/5825; H01M 4/623; H01M 4/625;
            (Continued)

(56) References Cited

FOREIGN PATENT DOCUMENTS

CN        101359733 A        2/2009
CN        105702961 A        6/2016
                (Continued)

OTHER PUBLICATIONS

Machine translation of CN 0110212167, retrieved from <www.espacenet.com> on Jan. 21, 2025. (Year: 2025).*
            (Continued)

*Primary Examiner* — Cynthia K Walls
(74) *Attorney, Agent, or Firm* — Maier & Maier, PLLC

(57)        ABSTRACT

A lithium supplementing material includes $Li_5MO_4$ and a semiconductor oxide on a surface thereof, where M includes at least one of Fe, Ni, Mn, Ru, Cr, Cu, Nb, Al, or Mo. In this application, the lithium supplementing material containing the semiconductor oxide is used, which can significantly enhance electronic conductance of the lithium supplementing material, reduce polarization, and greatly improve a specific charge capacity of the lithium supplementing material. Applying the lithium supplementing material to a positive electrode of an electrochemical apparatus can effectively increase an energy density of the electrochemical apparatus, and also improve rate performance and cycle stability.

18 Claims, 6 Drawing Sheets

(51) Int. Cl.

| | | |
|---|---|---|
| *H01M 4/58* | (2010.01) | |
| *H01M 4/62* | (2006.01) | |
| *H01M 4/02* | (2006.01) | |

(52) U.S. Cl.
CPC ........... *H01M 4/623* (2013.01); *H01M 4/625* (2013.01); *H01M 2004/028* (2013.01)

(58) Field of Classification Search
CPC ....... H01M 2004/028; H01M 10/0525; H01M 4/131; H01M 4/136; H01M 4/62; Y02E 60/10
See application file for complete search history.

(56) References Cited

FOREIGN PATENT DOCUMENTS

| | | | |
|---|---|---|---|
| CN | 106684291 A | 5/2017 |
| CN | 108232343 A | 6/2018 |
| CN | 110197868 A | 9/2018 |
| CN | 108767225 A | 11/2018 |
| CN | 109244364 A | 1/2019 |
| CN | 109713238 A | 5/2019 |
| CN | 109755448 A | 5/2019 |
| CN | 110212167 A | 9/2019 |
| CN | 110299496 A | 10/2019 |
| CN | 110323421 A | 10/2019 |
| JP | 4086653 B2 | 5/2008 |
| JP | 2018154549 A | 10/2018 |
| JP | 2019085315 A | 6/2019 |

OTHER PUBLICATIONS

Machine translation of CN 108767225, retrieved from <www.espacenet.com> on Jan. 24, 2025. (Year: 2025).*

ISR for International Application PCT/CN2019/122058 dated Jul. 29, 2020.

Written Opinion for International Application PCT/CN2019/122058 dated Jul. 29, 2020.

Chinese OA1 for counterpart application 201911066786.6 dated Aug. 3, 2020.

Chinese OA2 for counterpart application 201911066786.6 dated Oct. 27, 2020.

\* cited by examiner

LITHIUM SUPPLEMENTING MATERIAL AND POSITIVE ELECTRODE CONTAINING SAME

CROSS-REFERENCE TO RELATED APPLICATIONS

The present application is a continuation of National Phase Application PCT/CN2019/122058 filed on Nov. 29, 2019, which claims the benefit of priority from Chinese patent application 201911066786.6 filed on Nov. 4, 2019, the disclosure of which is hereby incorporated by reference in its entirety

TECHNICAL FIELD

This application relates to the field of electrochemistry, and in particular, to a lithium supplementing material and a positive electrode containing the same.

BACKGROUND

As electronic technologies rapidly develop, electrical equipment such as mobile phones, notebook computers, cameras, and electric power tools increases, and people have a growing demand for energy storage power supplies. Development of high-capacity, long service life, and good safety performance secondary batteries is becoming an imminent task. Compared with lead-acid batteries, nickel-cadmium batteries, nickel-metal hydride batteries, and the like, lithium-ion batteries have been widely used for their advantages such as a high energy density, a high power density, long life, good safety, low self-discharge, and a wide temperature adaptation range.

In a first charge and discharge process of a lithium-ion battery, a solid electrolyte interface (SEI) film layer is formed on a surface of a negative electrode, which will convert a large amount of active lithium into lithium carbonate, lithium fluoride, and alkyl lithium, causing lithium losses in a positive electrode material, and reducing first coulomb efficiency and a battery capacity of the battery. In a lithium-ion battery system using a graphite negative electrode, approximately 10% of a lithium source is consumed for first charge. When a negative electrode material with a high specific capacity, for example, a negative electrode in alloys (silicon, tin, or the like), oxides (silicon oxide and tin oxide), and amorphous carbon, is used, consumption of a positive lithium source further increases.

To further increase energy densities of lithium-ion batteries, pre-supplementing a positive or negative electrode with lithium is an effective method. However, a current negative electrode lithium supplementing material has the following defects: the material is too active to be stored stably for a long time, which increases operational difficulties and production risks. Therefore, a relatively safer and easier-to-operate positive electrode lithium supplementing process has attracted more attention. However, a common anti-fluorite positive electrode lithium supplementing material has poor electrical conductivity, which leads to serious polarization during charging, so that the positive electrode lithium supplementing material cannot exert its full theoretical specific capacity.

Therefore, development of a positive electrode lithium supplementing material with good stability, easy operation, and good electrical conductivity has become an imminent task in the current field of electrochemistry.

SUMMARY

This application provides a lithium supplementing material containing a semiconductor oxide and a positive electrode containing the same, to address at least one issue in the related field, at least to some extent.

According to an embodiment of this application, this application provides a positive electrode lithium supplementing material containing a semiconductor oxide and $Li_5MO_4$. The semiconductor oxide with good electrical conductivity is a coating layer, and may include at least one of tin oxide, indium oxide, antimony tin oxide, or indium tin oxide; the semiconductor oxide covers at least a part of a surface of $Li_5MO_4$; and $Li_5MO_4$ is an anti-fluorite type compound, where M includes at least one of Fe, Ni, Mn, Ru, Cr, Cu, Nb, Al, or Mo, and preferably, $Li_5FeO_4$.

According to this embodiment of this application, a weight of the uniform semiconductor oxide coating layer is approximately 0.5 wt % to 3 wt % of $Li_5MO_4$. According to this embodiment of this application, when the semiconductor oxide is antimony tin oxide, a molar ratio of antimony to tin in the semiconductor oxide is approximately 0.1:1 to 0.5:1; and when the semiconductor oxide is indium tin oxide, a molar ratio of tin to indium in the semiconductor oxide is approximately 0.1:1 to 0.5:1.

According to an embodiment of this application, this application provides a method for preparing a lithium supplementing material containing a semiconductor oxide. The specific steps include: first dispersing the semiconductor oxide in an organic solvent to obtain a suspension containing the semiconductor oxide, where the solvent is preferably ethanol; then adding $Li_5MO_4$ into the suspension to mix uniformly to obtain a uniform mixed solution, where the uniform mixing method may be magnetic stirring, mechanical stirring, or ultrasonic processing, and a stirring or ultrasonic processing time is 0.5 h to 2 h; finally, performing drying processing on the mixed solution to obtain a lithium supplementing material containing the semiconductor oxide, where the drying processing is preferably spray drying.

According to an embodiment of this application, this application provides a positive electrode, including a positive active material, a conductive agent, a binder, and a positive electrode lithium supplementing material coated with any of the foregoing semiconductor oxides or a positive electrode lithium supplementing material coated with the semiconductor oxide obtained through the foregoing preparation method.

According to this embodiment of this application, the positive active material includes at least one of lithium cobaltate, lithium iron phosphate, lithium iron manganese phosphate, lithium vanadium phosphate, lithium vanadium phosphate oxygen, lithium vanadate, lithium manganate, lithium nickelate, lithium nickel cobalt manganate, a lithium-rich manganese-based material, or lithium nickel cobalt aluminate.

According to this embodiment of this application, the conductive agent includes at least one of conductive carbon black, carbon fiber, acetylene black, Ketjen black, graphene, or carbon nanotube.

According to this embodiment of this application, the binder includes at least one of polypropylene, polyethylene, polyvinylidene fluoride, vinylidene fluoride-hexafluoropropylene, polytetrafluoroethylene, or polyhexafluoropropylene.

According to an embodiment of this application, this application provides an electrochemical apparatus, including any one of the foregoing positive electrodes.

According to an embodiment of this application, this application provides an electronic apparatus, including any one of the foregoing electrochemical apparatuses.

Additional aspects and advantages of the embodiments of this application are partially described and presented in the later description, or explained by implementation of the embodiments of this application.

BRIEF DESCRIPTION OF DRAWINGS

The following briefly describes the accompanying drawings necessary to describe embodiments of this application or the prior art to describe the embodiments of this application. Obviously, the accompanying drawings in the following descriptions are only some of the embodiments of this application. Those skilled in the art may still derive accompanying drawings of other embodiments from the structures illustrated in these drawings without creative efforts.

DETAILED DESCRIPTION

Figure 1:
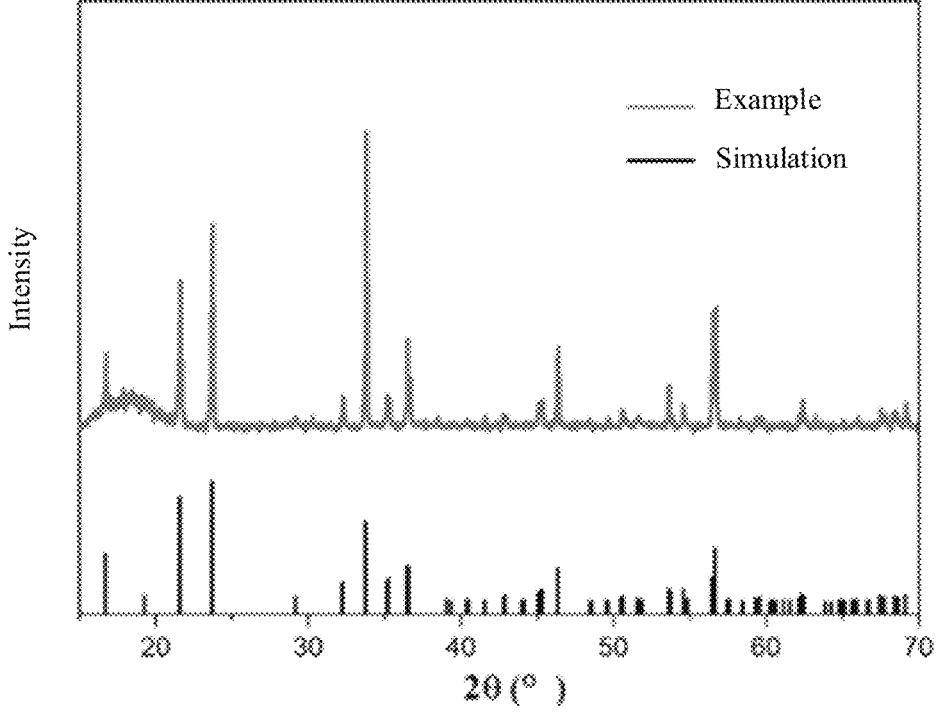
FIG. 1 is an X-ray diffraction (XRD) spectrum of $Li_5FeO_4$ in Example 1 and theoretically simulated $Li_5FeO_4$.

Embodiments of this application are described in detail below. In the full text of the specification of this application, the same or similar components and components with the same or similar functions are indicated by similar reference signs. The embodiments related to the accompanying drawings described herein are illustrative and diagrammatic, and are used to provide a basic understanding of this application. The embodiments of this application shall not be construed as a limitation on this application.

The terms "about", "roughly", "substantially", and "approximately" used herein are intended to describe and represent small variations. When used in combination with an event or a circumstance, the terms may refer to an example in which the exact event or circumstance occurs or an example in which an extremely similar event or circumstance occurs. For example, when used in combination with a value, the terms may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of an average value of the values (for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values may be considered "roughly" the same.

In addition, quantities, ratios, and other values are sometimes presented in the format of ranges in this specification. It should be understood that such range formats are used for convenience and simplicity and should be flexibly understood as including not only values clearly designated as falling within the range but also all individual values or sub-ranges covered by the range as if each value and sub-range were clearly designated.

In the description of embodiments and claims, a list of items preceded by the terms such as "at least one of", "at least one piece of", "at least one type of", or other similar terms may mean any combination of the listed items. For example, if items A and B are listed, the phrase "at least one of A and B" means only A, only B, or A and B. In another example, if items A, B, and C are listed, the phrase "at least one of A, B, and C" means only A, only B, only C, A and B (excluding C), A and C (excluding B), B and C (excluding A), or all of A, B, and C. The item A may contain a single element or a plurality of elements. The item B may contain a single element or a plurality of elements. The item C may contain a single element or a plurality of elements.

Generally, a by-product with poor electrical conductivity is left on a positive electrode plate after the first cycle of delithiation performed on a positive electrode lithium supplementing material, which deteriorates rate performance of a lithium ion battery. However, this application uses a semiconductor oxide such as tin oxide, indium oxide, antimony tin oxide, and/or indium tin oxide with good electrical conductivity to coat a surface of a $Li_5MO_4$ material, improving electrical conductivity of a delithiation product of the $Li_5MO_4$ material, and improving the rate performance of the lithium-ion battery after lithium supplementing. In addition, the semiconductor oxide is not sensitive to external environments such as heat and humidity, can withstand high-pressure oxidation and maintain permanent electrical conductivity, thereby improving cycle performance of an electrochemical apparatus such as the lithium ion battery.

This application provides a lithium supplementing material and a preparation method thereof, and further provides a positive electrode including the lithium supplementing material, an electrochemical apparatus, and an electronic apparatus.

I. Lithium Supplementing Material

This application provides a lithium supplementing material, including $Li_5MO_4$ and a semiconductor oxide on a surface thereof, where the semiconductor oxide coats at least a part of the surface of $Li_5MO_4$, and M includes at least one of Fe, Ni, Mn, Ru, Cr, Cu, Nb, Al, or Mo. It can be understood that, for the $Li_5MO_4$ material described in this application, M may be arbitrarily selected and matched among the elements (Fe, Ni, Mn, Ru, Cr, Cu, Nb, Al, or Mo). For clarity and simplicity of description, only $Li_5FeO_4$ and $Li_5AlO_4$ are used in this application as examples for discussion.

In some embodiments, the $Li_5MO_4$ material is $Li_5FeO_4$.

In some embodiments, the $Li_5MO_4$ material is $Li_5AlO_4$.

In some embodiments, the semiconductor oxide includes at least one of tin oxide, indium oxide, antimony tin oxide, or indium tin oxide.

Figure 2:
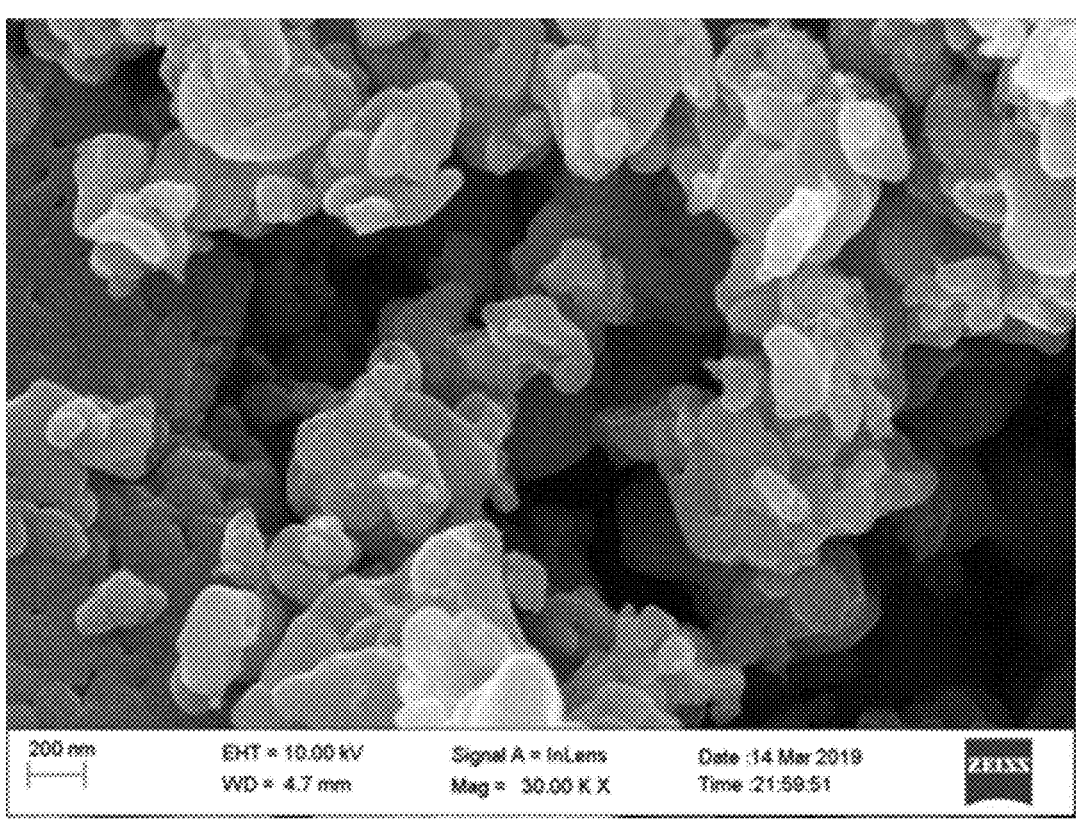
FIG. 2 is a scanning electron microscope (SEM) diagram of indium oxide-coated $Li_5FeO_4$ in Example 1.

In some embodiments, the semiconductor oxide forms a uniform coating layer on the surface of $Li_5MO_4$. FIG. 2 is an SEM diagram of semiconductor oxide-coated $Li_5MO_4$ (indium oxide-coated $Li_5FeO_4$, in which a weight percentage of indium oxide is 2 wt %) in Example 1. As shown in FIG. 2, indium oxide adheres to surfaces of $Li_5FeO_4$ particles to form a uniform coating layer.

In some embodiments, based on a weight of $Li_5MO_4$, a weight percentage of the semiconductor oxide is approximately 0.5 wt % to approximately 3 wt %. In some embodiments, based on a weight of $Li_5MO_4$, a weight percentage of the semiconductor oxide is approximately 0.5 wt % to approximately 1 wt %, approximately 0.5 wt % to approximately 1.5 wt %, approximately 0.5 wt % to approximately 2 wt %, approximately 0.5 wt % to approximately 2.5 wt %, approximately 1 wt % to approximately 2 wt %, approximately 1 wt % to approximately 3 wt %, approximately 2 wt % to approximately 3 wt %, or the like.

In some embodiments, the semiconductor oxide is antimony tin oxide, and a molar ratio of antimony to tin in the semiconductor oxide is approximately 0.1:1 to approximately 0.5:1. In some embodiments, the semiconductor oxide is antimony tin oxide, and a molar ratio of antimony to tin in the semiconductor oxide is approximately 0.1:1 to approximately 0.2:1, approximately 0.1:1 to approximately 0.3:1, approximately 0.1:1 to approximately 0.4:1, approximately 0.2:1 to approximately 0.4:1, approximately 0.2:1 to approximately 0.5:1, or the like.

In some embodiments, the semiconductor oxide is indium tin oxide, and a molar ratio of tin to indium in the semiconductor oxide is approximately 0.1:1 to approximately 0.5:1. In some embodiments, the semiconductor oxide is indium tin oxide, and a molar ratio of tin to indium in the semiconductor oxide is approximately 0.1:1 to approximately 0.2:1, approximately 0.1:1 to approximately 0.3:1, approximately 0.1:1 to approximately 0.4:1, approximately 0.2:1 to approximately 0.4:1, approximately 0.2:1 to approximately 0.5:1, or the like.

II. Method for Preparing a Lithium Supplementing Material

This application provides a method for preparing a lithium supplementing material. The method includes: dispersing a semiconductor oxide in a solvent to obtain a suspension containing the semiconductor oxide; adding the $Li_5MO_4$ material to the suspension to mix uniformly to obtain a uniform mixed solution; and performing drying processing on the mixed solution to obtain a lithium supplementing material.

In some embodiments, magnetic stirring, mechanical stirring, or ultrasonic processing is used for mixing, and a stirring or ultrasonic processing time is approximately 0.5 h to approximately 2 h. In some embodiments, the stirring or ultrasonic processing time is approximately 0.5 h to approximately 1 h, approximately 0.5 h to approximately 1.5 h, approximately 1 h to approximately 2 h, or the like.

In some embodiments, ethanol is selected as the solvent. In some embodiments, spray drying is selected for drying processing. After spray drying, the solvent may be completely volatilized without introducing any impurities. In addition, according to this application, neither high-temperature calcination nor crushing is required after spray drying. Therefore, an operation is simple, and costs are low.

In this application, coating the semiconductor oxide on the surface of the $Li_5MO_4$ material can significantly enhance electronic conductance of the lithium supplementing material, reduce polarization, and greatly improve a specific charge capacity of the lithium supplementing material. Adding the lithium supplementing material of this application to a positive electrode of an electrochemical apparatus can reduce an amount of positive electrode lithium supplementing materials and increase an energy density of the electrochemical apparatus.

The lithium supplementing material of this application is stable in properties, resistant to a high-pressure oxidation, insensitive to an environment, and can permanently maintain its excellent electrical conductivity. Therefore, rate performance and cycle performance of the electrochemical apparatus such as a lithium-ion battery can be effectively improved.

III. Positive Electrode Including the Lithium Supplementing Material

This application provides a positive electrode. The positive electrode includes a positive active material, a conductive agent, a binder, and any one of the lithium supplementing materials or the lithium supplementing material obtained through the foregoing preparation method.

In some embodiments, the positive active material includes at least one of lithium cobaltate, lithium iron phosphate, lithium iron manganese phosphate, lithium vanadium phosphate, lithium vanadium phosphate oxygen, lithium vanadate, lithium manganate, lithium nickelate, lithium nickel cobalt manganate, a lithium-rich manganese-based material, or lithium nickel cobalt aluminate. In some embodiments, the positive active material includes at least one of lithium cobaltate or lithium nickel cobalt manganate.

In some embodiments, the conductive agent includes at least one of conductive carbon black, carbon fiber, acetylene black, Ketjen black, graphene, or carbon nanotube. In some embodiments, the conductive agent includes conductive carbon black.

In some embodiments, the binder includes at least one of polypropylene, polyethylene, polyvinylidene fluoride, vinylidene fluoride-hexafluoropropylene, polytetrafluoroethylene, or polyhexafluoropropylene. In some embodiments, the binder includes polyvinylidene fluoride.

In some embodiments, the lithium supplementing material, the positive active material, the conductive agent, and the binder are mixed in a specific ratio and uniformly coated on a positive current collector (for example, an aluminum current collector) for preparing the positive electrode.

In some embodiments, the lithium supplementing material may also be pre-coated on the positive current collector to form a lithium supplementing material layer, and then the positive active material is coated on the lithium supplementing material layer to form the positive electrode. In some embodiments, the positive active material is coated on the positive current collector to form a positive active material layer, and then the lithium supplementing material is coated on the positive active material layer to form the positive electrode.

IV. Electrochemical Apparatus

The electrochemical apparatus of this application includes any one of the foregoing positive electrodes of this application. The electrochemical apparatus of this application may include any apparatus in which an electrochemical reaction takes place. Specific examples of the apparatus include all kinds of primary batteries, secondary batteries, fuel batteries, solar batteries, or capacitors. Especially, the electrochemical apparatus is a lithium secondary battery, including a lithium metal secondary battery, a lithium-ion secondary battery, a lithium polymer secondary battery, or a lithium-ion polymer secondary battery. In some embodiments, the electrochemical apparatus of this application includes the positive electrode of this application, a negative electrode, a separator disposed between the positive electrode and the negative electrode, and an electrolyte solution.

In some embodiments, the negative electrode includes a negative active material. The negative active material is capable of absorbing and releasing lithium (hereinafter, sometimes referred to as "a negative active material capable of absorbing/releasing lithium"). Examples of the negative active material capable of absorbing/releasing lithium may include a carbon material, a metal compound, an oxide, a sulfide, a lithium nitride such as $LiN_3$, a lithium metal, a metal forming an alloy with lithium, and a polymer material.

In some embodiments, examples of the carbon material may include low graphitized carbon, easily graphitized carbon, artificial graphite, natural graphite, mesocarbon microbeads, soft carbon, hard carbon, pyrolysis carbon, coke, glassy carbon, organic polymer compound sintered body, carbon fiber, and activated carbon. The coke may include pitch coke, needle coke, and petroleum coke. The organic polymer compound sintered body refers to a material obtained by calcining and carbonizing a polymer material such as phenol plastic or furan resin at an appropriate temperature, and some of these materials are classified into low graphitized carbon or easily graphitized carbon. Examples of the polymer material may include polyacetylene and polypyrrole.

In some embodiments, among these negative active materials capable of absorbing/releasing lithium, a material having charge and discharge voltage close to that of the lithium metal is selected. This is because lower charge and discharge voltage of the negative active material makes the lithium-ion battery easier to have a higher energy density. A carbon material can be selected as the negative active material because a crystal structure of the carbon material has only a small change during charge and discharge, and therefore good cycle performance and a high charge and discharge capacity can be obtained. For example, graphite is selected because it can have a large electrochemical equivalent and a high energy density.

In some embodiments, the negative active material capable of absorbing/releasing lithium may include an elemental lithium metal, a metal element and a semi-metal element capable of forming an alloy with lithium, an alloy and a compound containing such elements, and the like. For example, the negative active material is used together with the carbon material, and in this case, good cycle performance and a high energy density can be obtained. In addition to an alloy containing two or more metal elements, the alloy used herein also includes an alloy containing one or more metal elements and one or more semi-metal elements. The alloy can be in the following states: a solid solution, a eutectic crystal, an intermetallic compound, and a mixture thereof.

In some embodiments, examples of the metal element and the semi-metal element may include tin (Sn), lead (Pb), aluminum (Al), indium (In), silicon (Si), zinc (Zn), antimony (Sb), bismuth (Bi), cadmium (Cd), magnesium (Mg), boron (B), gallium (Ga), germanium (Ge), arsenic (As), silver (Ag), zirconium (Zr), yttrium (Y), or hafnium (Hf). Examples of the foregoing alloy and compound may include a material with a chemical formula: $Ma_sMb_tLi_u$ and a material with a chemical formula: $Ma_pMc_gMd_r$. In these chemical formulas, Ma represents at least one of a metal element and a semi-metal element that can form an alloy with lithium; Mb represents at least one of a metal element and a semi-metal element other than lithium and Ma; Mc represents at least one element among non-metal elements; Md represents at least one element among a metal element and a semi-metal element other than Ma; and s, t, u, p, q, and r satisfy $s>0$, $t\geq0$, $u\geq0$, $p>0$, $q>0$, and $r\geq0$.

In some embodiments, an inorganic compound that does not include lithium, such as $MnO_2$, $SiO_2$, $V_2O_5$, $V_6O_{13}$, NiS, or MoS, may be used in the negative electrode.

In some embodiments, the negative electrode may further include a binder. The binder enhances binding between particles of the negative active material, and binding between the negative active material and the current collector. In some embodiments, the binder includes, but is not limited to: polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly (1,1-difluoroethylene), polyethylene, polypropylene, polypropylene acid, styrene-butadiene rubber, acrylic styrene-butadiene rubber, epoxy resin, and nylon.

In some embodiments, the negative electrode may further include a conductive agent. The conductive agent includes, but is not limited to: a carbon-based material, a metal-based material, a conductive polymer, or a mixture thereof. In some embodiments, the carbon-based material is selected from natural graphite, artificial graphite, conductive carbon black, acetylene black, Ketjen black, carbon fiber, or any combination thereof. In some embodiments, the metal-based material is selected from metal powder, metal fibers, copper, nickel, aluminum, or silver. In some embodiments, the conductive polymer is a polyphenylene derivative.

In some embodiments, the negative current collector includes, but is not limited to: copper foil, nickel foil, stainless steel foil, titanium foil, nickel foam, copper foam, a polymer substrate coated with a conductive metal, and any combination thereof.

In some embodiments, the separator includes, but is not limited to: at least one selected from polyethylene, polypropylene, polyethylene terephthalate, polyimide, and aramid. For example, polyethylene includes at least one component selected from high-density polyethylene, low-density polyethylene, and ultra-high-molecular-weight polyethylene. Particularly, polyethylene and polypropylene have a good effect on preventing short-circuit, and can improve stability of the lithium-ion battery through the shutdown effect.

In some embodiments, the electrolyte may be one or more of a gel electrolyte, a solid electrolyte, and an electrolyte solution, and the electrolyte solution includes a lithium salt and a non-aqueous solvent.

In some embodiments, the lithium salt may be selected from one or more of $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiSiF_6$, LiBOB, or lithium difluoroborate. For example, $LiPF_6$ is selected as the lithium salt because it can provide a high ionic conductivity and improve the cycle performance.

In some embodiments, the non-aqueous solvent may be a carbonate compound, a carboxylate compound, an ether compound, another organic solvent, or a combination thereof.

In some embodiments, the carbonate compound may be a linear carbonate compound, a cyclic carbonate compound, a fluorocarbonate compound, or a combination thereof.

In some embodiments, an example of the linear carbonate compound is diethyl carbonate (DEC), dimethyl carbonate (DMC), dipropyl carbonate (DPC), methyl propyl carbonate (MPC), ethylene propyl carbonate (EPC), ethyl methyl carbonate (EMC), or a combination thereof. An example of the cyclic carbonate compound is ethylene carbonate (EC), propylene carbonate (PC), butylene carbonate (BC), vinyl ethylene carbonate (VEC), or a combination thereof. An example of the fluorocarbonate compound is fluoroethylene carbonate (FEC), 1,2-difluoroethylene carbonate, 1,1-difluoroethylene carbonate, 1,1,2-tricarbonate Fluoroethylene, 1,1,2,2-tetrafluoroethylene carbonate, 1-fluoro-2-methylethylene carbonate, 1-fluoro-1-methylethylene carbonate, carbonic acid 1,2-Difluoro-1-methylethylene, 1,1,2-trifluoro-2-methylethylene carbonate, trifluoromethylethylene carbonate, or a combination thereof.

In some embodiments, an example of the carboxylate compound is methyl acetate, ethyl acetate, n-propyl acetate, tert-butyl acetate, methyl propionate, ethyl propionate, propyl propionate, γ-butyrolactone Ester, caprolactone, valerolactone, mevalonolactone, caprolactone, methyl formate, or a combination thereof.

In some embodiments, an example of the ether compound is dibutyl ether, tetraglyme, diglyme, 1,2-dimethoxyethane, 1,2-diethoxyethane, Ethoxymethoxyethane, 2-methyltetrahydrofuran, tetrahydrofuran, or a combination thereof.

In some embodiments, an example of the another organic solvent is dimethyl sulfoxide, 1,2-dioxolane, sulfolane, methyl sulfolane, 1,3-dimethyl-2-imidazolidinone, N-methyl-2-pyrrolidone, formamide, dimethylformamide, acetonitrile, trimethyl phosphate, triethyl phosphate, trioctyl phosphate, phosphate ester, or a combination thereof.

V. Electronic Apparatus

The electrochemical apparatus manufactured from the lithium supplementing material described in this application is suitable for electronic apparatuses in various fields.

The electrochemical apparatus of this application is not particularly limited to any purpose, and may be used for any known purposes in the prior art. In one embodiment, the electrochemical apparatus of this application may be used without limitation in with limitation in notebook computers, pen-input computers, mobile computers, electronic book players, portable telephones, portable fax machines, portable copiers, portable printers, stereo headsets, video recorders, liquid crystal televisions, portable cleaners, portable CD players, mini-disc players, transceivers, electronic notebooks, calculators, storage cards, portable recorders, radios, backup power sources, motors, automobiles, motorcycles, motor bicycles, bicycles, lighting appliances, toys, game machines, clocks, electric tools, flash lamps, cameras, large household batteries, lithium-ion capacitors, and the like.

VI. EXAMPLES

Below, this application will be further specifically described with examples and comparative examples, and this application is not limited to these embodiments as long as the essence of this application is not changed. In the examples and comparative examples, the positive current collectors are all aluminum foil, and the negative current collectors are all copper foil.

Example 1

$Li_5FeO_4$ was synthesized by using the method described in the literature (Zhang et al., "Mitigating the initial capacity loss and improving the cycling stability of silicon monoxide using $Li_5FeO_4$", 2018, Journal of Power Sources, Volume 400, Pages 540 to 555), and an XRD test was performed on the synthesized $Li_5FeO_4$ powder. As shown in FIG. 1, an XRD spectrum of the synthesized $Li_5FeO_4$ in Example 1 is well consistent with a theoretically simulated XRD spectrum of $Li_5FeO_4$, indicating that the synthesized $Li_5FeO_4$ in this application is a pure phase of $Li_5FeO_4$ with an anti-fluorite structure.

The indium oxide was dispersed in ethanol, and then the synthesized $Li_5FeO_4$ was added. After magnetic stirring was performed on the mixed solution for 2 h to mix uniformly, spray drying was performed, so that indium oxide-coated $Li_5FeO_4$ was formed. Based on a weight of $Li_5FeO_4$, a weight percentage of indium oxide was 2 wt %. FIG. 2 is an SEM diagram of the indium oxide-coated $Li_5FeO_4$. Obviously, an indium oxide coating layer is more uniform and a coating effect is better.

The indium oxide-coated $Li_5FeO_4$, conductive carbon black, and polyvinylidene fluoride were uniformly mixed in a weight ratio of 90:5:5 and coated on the positive current collector to prepare a positive electrode plate.

Figure 3:
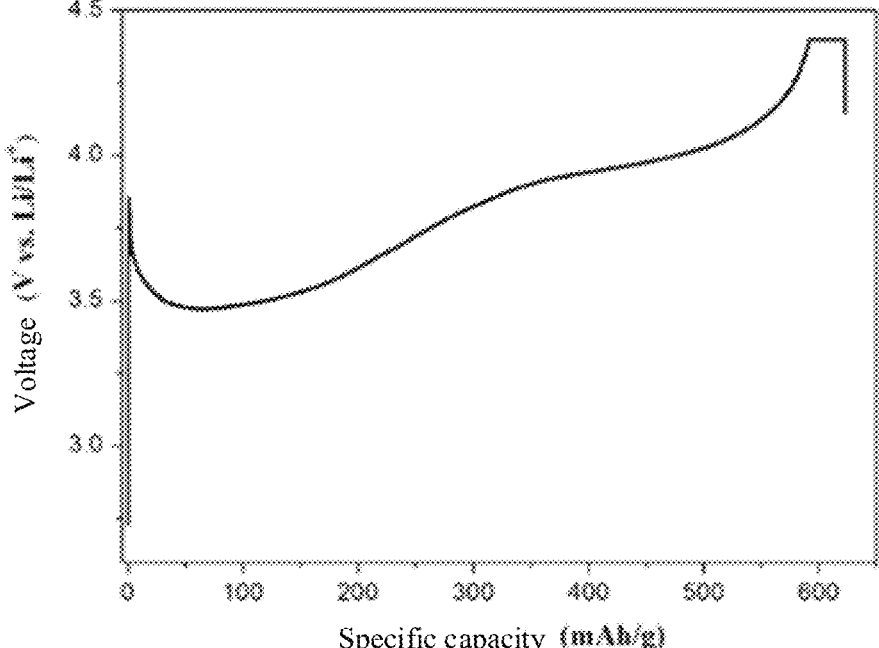
FIG. 3 is a curve of a charging voltage and a specific capacity of indium oxide-coated $Li_5FeO_4$ in Example 1.

A button half-cell was assembled with the prepared positive electrode plate as a working electrode and metal lithium as a counter electrode, and a charge capacity of the button half-cell was tested. FIG. 3 is a curve of a charging voltage and a specific capacity of indium oxide-coated $Li_5FeO_4$ in Example 1.

Example 2

$Li_5FeO_4$ was synthesized by using the method of Example 1.

The indium tin oxide (a molar ratio of tin to indium is 0.5:1) was dispersed in ethanol, and then $Li_5FeO_4$ was added. After magnetic stirring was performed on the mixed solution for 0.5 h to mix uniformly, spray drying was performed, so that indium tin oxide-coated $Li_5FeO_4$ was formed. Based on a weight of $Li_5FeO_4$, a weight percentage of indium tin oxide was 2 wt %.

The indium tin oxide-coated $Li_5FeO_4$, conductive carbon black, and polyvinylidene fluoride were uniformly mixed in a weight ratio of 90:5:5 and coated on the positive current collector to prepare a positive electrode plate.

Figure 4:
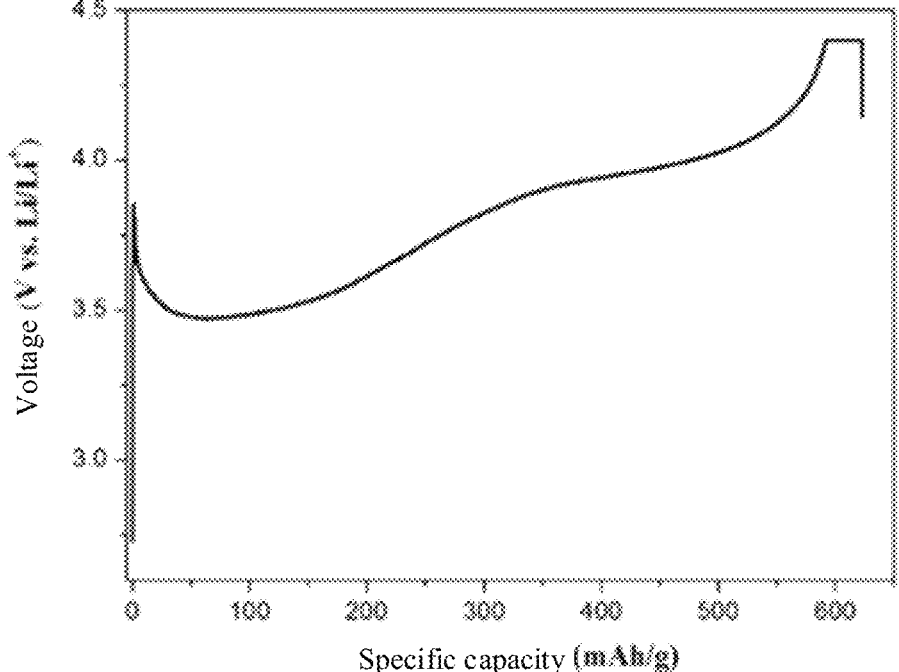
FIG. 4 is a curve of a charging voltage and a specific capacity of indium tin oxide-coated $Li_5FeO_4$ in Example 2.

A button half-cell was assembled with the prepared positive electrode plate as a working electrode and metal lithium as a counter electrode, and a charge capacity of the button half-cell was tested. FIG. 4 is a curve of a charging voltage and a specific capacity of indium tin oxide-coated $Li_5FeO_4$ in Example 2.

Example 3

The indium oxide-coated $Li_5FeO_4$ was prepared by using the method of Example 1.

Indium oxide-coated $Li_5FeO_4$, $LiCoO_2$, conductive carbon black, and polyvinylidene fluoride were uniformly mixed in a weight ratio of 3:87:5:5 and coated on the positive current collector to prepare a positive electrode plate.

Silicon oxide, conductive carbon black, and polyacrylic acid (PAA) were uniformly mixed in a weight ratio of 90:5:5 and applied on the negative current collector to prepare a negative electrode plate.

The positive electrode plate and the negative electrode plate prepared above were assembled into a lithium-ion battery, and rate performance and cycle performance of the lithium-ion battery were tested.

Example 4

This example was basically the same as Example 3, except that indium oxide-coated $Li_5FeO_4$:LiCoO$_2$:conductive carbon black:polyvinylidene fluoride was equal to 5:85:5:5.

Example 5

Indium tin oxide-coated $Li_5FeO_4$ was obtained by using the method of Example 2.

Indium tin oxide-coated $Li_5FeO_4$, LiCoO$_2$, conductive carbon black, and polyvinylidene fluoride were uniformly mixed in a weight ratio of 3:87:5:5 and coated on the positive current collector to prepare a positive electrode plate.

Silicon oxide, conductive carbon black, and polyacrylic acid were uniformly mixed in a weight ratio of 90:5:5 and applied on the negative current collector to prepare a negative electrode plate.

The positive electrode plate and the negative electrode plate prepared above were assembled into a lithium-ion battery, and rate performance and cycle performance of the lithium-ion battery were tested.

Example 6

This example was basically the same as Example 5, except that indium tin oxide-coated $Li_5FeO_4$:LiCoO$_2$:conductive carbon black:polyvinylidene fluoride was equal to 5:85:5:5.

Example 7

This example was basically the same as Example 5, except that a molar ratio of tin to indium in the used indium tin oxide was 0.1:1.

Example 8

This example was basically the same as Example 7, except that indium tin oxide-coated $Li_5FeO_4$:LiCoO$_2$:conductive carbon black:polyvinylidene fluoride was equal to 5:85:5:5.

Example 9

This example was basically the same as Example 5, except that the semiconductor oxide used was antimony tin oxide with a molar ratio of tin to antimony of 0.5:1.

Example 10

This example was basically the same as Example 9, except that antimony tin oxide-coated $Li_5FeO_4$:LiCoO$_2$:conductive carbon black:polyvinylidene fluoride was equal to 5:85:5:5.

Example 11

This example was basically the same as Example 9, except that a molar ratio of tin to antimony in the used antimony tin oxide was 0.1:1.

Example 12

This example was basically the same as Example 11, except that antimony tin oxide-coated $Li_5FeO_4$:LiCoO$_2$:conductive carbon black:polyvinylidene fluoride was equal to 5:85:5:5.

Example 13

This example was basically the same as Example 3, except that indium oxide-coated $Li_5FeO_4$, $LiNi_{0.5}Co_{0.2}Mn_{0.3}O_2$, conductive carbon black, and polyvinylidene fluoride were uniformly mixed in a weight ratio of 2:88:5:5 and coated on the positive current collector to prepare a positive electrode plate.

Example 14

This example was basically the same as Example 3, except that indium oxide-coated $Li_5FeO_4$, $LiNi_{0.5}Co_{0.2}Mn_{0.3}O_2$, conductive carbon black, and polyvinylidene fluoride were uniformly mixed in a weight ratio of 4:86:5:5 and coated on the positive current collector to prepare a positive electrode plate.

Example 15

This example was basically the same as Example 5, except that indium tin oxide-coated $Li_5FeO_4$, $LiNi_{0.5}Co_{0.2}Mn_{0.3}O_2$, conductive carbon black, and polyvinylidene fluoride were uniformly mixed in a weight ratio of 2:88:5:5 and coated on the positive current collector to prepare a positive electrode plate.

Example 16

This example was basically the same as Example 7, except that indium tin oxide-coated $Li_5FeO_4$, $LiNi_{0.5}Co_{0.2}Mn_{0.3}O_2$, conductive carbon black, and polyvinylidene fluoride were uniformly mixed in a weight ratio of 4:86:5:5 and coated on the positive current collector to prepare a positive electrode plate.

Example 17

This example was basically the same as Example 9, except that antimony tin oxide-coated $Li_5FeO_4$, $LiNi_{0.5}Co_{0.2}Mn_{0.3}O_2$, conductive carbon black, and polyvinylidene fluoride were uniformly mixed in a weight ratio of 2:88:5:5 and coated on the positive current collector to prepare a positive electrode plate.

Example 18

This example was basically the same as Example 11, except that antimony tin oxide-coated $Li_5FeO_4$, $LiNi_{0.5}Co_{0.2}Mn_{0.3}O_2$, conductive carbon black, and polyvinylidene fluoride were uniformly mixed in a weight ratio of 4:86:5:5 and coated on the positive current collector to prepare a positive electrode plate.

Example 19

$Li_5AlO_4$ was first synthesized by using the method of Example 1. $Li_5AlO_4$ was then coated by indium oxide by using the method of Example 1.

Indium oxide-coated $Li_5AlO_4$, $LiCoO_2$, conductive carbon black, and polyvinylidene fluoride were uniformly mixed in a weight ratio of 3:87:5:5 and coated on the positive current collector to prepare a positive electrode plate.

Silicon oxide, conductive carbon black, and polyacrylic acid (PAA) were uniformly mixed in a weight ratio of 90:5:5 and applied on the negative current collector to prepare a negative electrode plate.

The positive electrode plate and the negative electrode plate prepared above were assembled into a lithium-ion battery, and rate performance and cycle performance of the lithium-ion battery were tested.

Comparative Example 1

$Li_5FeO_4$ was synthesized by using the method of Example 1.

$Li_5FeO_4$, conductive carbon black, and polyvinylidene fluoride were uniformly mixed in a weight ratio of 90:5:5 and coated on the positive current collector to prepare a positive electrode plate.

Figure 5:
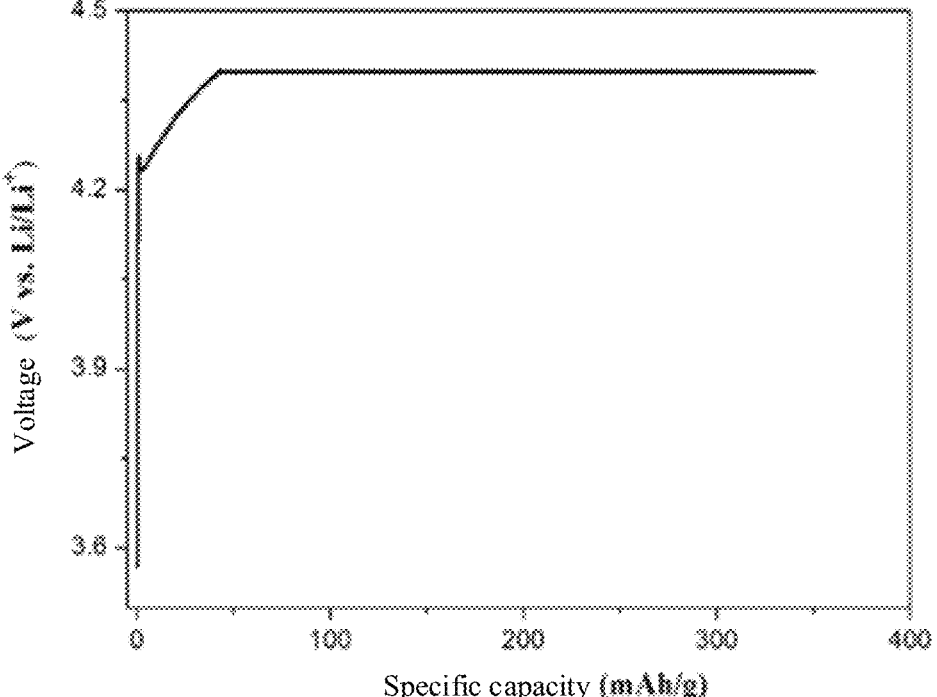
FIG. 5 is a curve of a charging voltage and a specific capacity of $Li_5FeO_4$ in Comparative Example 1.

A button half-cell was assembled with the prepared positive electrode plate as a working electrode and metal lithium as a counter electrode, and a charge capacity of the button half-cell was tested. FIG. 5 is a curve of a charging voltage and a specific capacity of a positive electrode lithium supplementing material $Li_5FeO_4$ in Comparative Example 1.

Comparative Example 2

$Li_5FeO_4$ was synthesized by using the method of Example 1.

$Li_5FeO_4$, $LiCoO_2$, conductive carbon black, and polyvinylidene fluoride were uniformly mixed in a weight ratio of 3:87:5:5 and coated on the positive current collector to prepare a positive electrode plate.

Silicon oxide, conductive carbon black, and polyacrylic acid were uniformly mixed in a weight ratio of 90:5:5 and applied on the negative current collector to prepare a negative electrode plate.

The positive electrode plate and the negative electrode plate prepared above were assembled into a lithium-ion battery, and rate performance and cycle performance of the lithium-ion battery were tested.

Comparative Example 3

This comparative example was basically the same as Comparative Example 2, except that $Li_5FeO_4$, $LiCoO_2$, conductive carbon black, and polyvinylidene fluoride were uniformly mixed in a weight ratio of 5:85:5:5 and coated on the positive current collector to prepare a positive electrode plate.

Comparative Example 4

This comparative example was basically the same as Comparative Example 2, except that $Li_5FeO_4$, $LiNi_{0.5}Co_{0.2}Mn_{0.3}O_2$, conductive carbon black, and polyvinylidene fluoride were uniformly mixed in a weight ratio of 2:88:5:5 and coated on the positive current collector to prepare a positive electrode plate.

Comparative Example 5

This comparative example was basically the same as Comparative Example 2, except that $Li_5FeO_4$, $LiNi_{0.5}Co_{0.2}Mn_{0.3}O_2$, conductive carbon black, and polyvinylidene fluoride were uniformly mixed in a weight ratio of 4:86:5:5 and coated on the positive current collector to prepare a positive electrode plate.

Comparative Example 6

$Li_5FeO_4$ was synthesized based on the method of Example 1.

Carbon coating was performed on $Li_5FeO_4$. Specific steps: $Li_5FeO_4$ and polyvinyl alcohol were mixed in a weight ratio of 99:1, and the mixed solution was sintered in an inert atmosphere (argon or nitrogen) for 12 h to prepare carbon-coated $Li_5FeO_4$, where a sintering temperature was 800° C.

Carbon-coated $Li_5FeO_4$, $LiCoO_2$, conductive carbon black, and polyvinylidene fluoride were uniformly mixed in a weight ratio of 3:87:5:5 and coated on the positive current collector to prepare a positive electrode plate.

Silicon oxide, conductive carbon black, and polyacrylic acid were uniformly mixed in a weight ratio of 90:5:5 and applied on the negative current collector to prepare a negative electrode plate.

The positive electrode plate and the negative electrode plate prepared above were assembled into a lithium-ion battery, and rate performance and cycle performance of the lithium-ion battery were tested.

Comparative Example 7

This comparative example was basically the same as Comparative Example 6, except that carbon-coated $Li_5FeO_4$, $LiNi_{0.5}Co_{0.2}Mn_{0.3}O_2$, conductive carbon black, and polyvinylidene fluoride were uniformly mixed in a weight ratio of 2:88:5:5 and coated on the positive current collector to prepare a positive electrode plate.

Comparative Example 8

$Li_5FeO_4$ was synthesized based on the method of Example 1.

$LiCoO_2$ was coated with $Li_5FeO_4$. $Li_5FeO_4$ and $LiCoO_2$ were mixed in a weight ratio of 3:87, and milled to mix uniformly. A milling ball was made of zirconia ceramic, a rotating speed was 500 rpm, and a milling time was 10 h. The milled raw material was sintered in an inert atmosphere (argon or nitrogen) for 10 h to form $Li_5FeO_4$-coated $LiCoO_2$, where a sintering temperature was 800° C.

$Li_5FeO_4$-coated $LiCoO_2$, conductive carbon black, and polyvinylidene fluoride were uniformly mixed in a weight ratio of 90:5:5 and applied on the positive current collector to prepare a positive electrode plate.

Silicon oxide, conductive carbon black, and polyacrylic acid were uniformly mixed in a weight ratio of 90:5:5 and applied on the negative current collector to prepare a negative electrode plate.

The positive electrode plate and the negative electrode plate prepared above were assembled into a lithium-ion battery, and rate performance and cycle performance of the lithium-ion battery were tested.

Comparative Example 9

This comparative example was basically the same as Comparative Example 8, except that $Li_5FeO_4$ was used to coat $LiNi_{0.5}Co_{0.2}Mn_{0.3}O_2$, where $Li_5FeO_4$: $LiNi_{0.5}Co_{0.2}Mn_{0.3}O_2$=2:88, and $Li_5FeO_4$-coated $LiNi_{0.5}Co_{0.2}Mn_{0.3}O_2$, conductive carbon black, and polyvinylidene fluoride were mixed uniformly in a weight ratio of 90:5:5, and applied on a positive current collector to prepare the positive electrode plate.

VII. Test Methods and Test Results

X-Ray Diffraction Test:

An X-ray diffraction tester (XPertPro MPD, PANalytical, Netherlands) was used, and the following test conditions were set: In Cu Kα radiation (λ=1.5418 Å), a working current was 250 mA, continuous scanning was used, a working voltage was 40 kV, a scanning range 20 was 10° to 70° with a step of 0.1°, a scanning speed was 0.2 seconds/step, and diffraction test was performed on sample powder to confirm a phase of the sample.

Charge Capacity Test:

In this application, the LAND CT2001A system was used for charge capacity test. A to-be-tested button half-cell was stood in an environment of 25±3° C. for 30 minutes, charged at a constant current of 0.05 C (a theoretical gram capacity of the active material $Li_5FeO_4$ was 690 mAh/g, and a theoretical gram capacity of $Li_5AlO_4$ was 850 mAh/g) to a voltage of 4.4 V (rated voltage), and then charged at a constant voltage to a current of 0.005 C. A relationship curve of the charging voltage and the gram capacity was recorded.

Charge gram capacity=Charge capacity/Weight of positive active material ($Li_5FeO_4$ or $Li_5AlO_4$).

Rate Performance Test:

In this application, the LAND CT2001A system was used to test the cycle performance of the electrochemical apparatus. A to-be-tested button half-cell was stood in an environment of 25±3° C. for 30 minutes, charged at a constant current of 0.1 C (a theoretical gram capacity of the positive active material $LiCoO_2$ was 170 mAh/g) to a voltage of 4.4 V (rated voltage), then charged at a constant voltage to a current of 0.025 C, and then discharged to 3 V (cut-off voltage) at rates of 0.1 C, 0.2 C, 0.5 C, 1 C, and 2 C. Discharge gram capacities under different discharge rates were recorded.

Discharge gram capacity=Discharge capacity/Weight of positive active material (lithium cobaltate).

Cycle Performance Test:

In this application, the LAND CT2001A system was used to test the rate performance of the electrochemical apparatus. A to-be-tested lithium-ion battery was stood in an environment of 25±3° C. for 30 minutes, charged at a constant current of 0.1 C (a theoretical gram capacity of $LiCoO_2$ was 170 mAh/g, and a theoretical gram capacity of $LiNi_{0.5}Co_{0.2}Mn_{0.3}O_2$ was 180 mAh/g) to a voltage of 4.4 V (rated voltage), then charged at a constant voltage to a current of 0.025 C, and then discharged to (a cut-off voltage) at a rate of 0.1 C. The above-mentioned charge/discharge steps were repeated for 2 cycles to complete chemical conversion of the electrochemical apparatus under test. Subsequently, 100 cycles were performed at a charge/discharge rate of 0.5 C in a range of 3 V to 4.4 V, and the discharge gram capacities before and after the cycle were recorded.

Discharge gram capacity=Discharge capacity/Weight of positive active material ($LiCoO_2$ or $LiNi_{0.5}Co_{0.2}Mn_{0.3}O_2$).

Table 1 and Table 2 respectively show rate performance test results and cycle performance test results of Comparative Example 2 to Comparative Example 9 and Example 3 to Example 19.

TABLE 1

| | Rate performance test results of Comparative Example 2 to Comparative Example 9 and Example 3 to Example 19 | | | | |
| --- | --- | --- | --- | --- | --- |
| | 0.1 C specific capacity (mAh/g) | 0.2 C specific capacity (mAh/g) | 0.5 C specific capacity (mAh/g) | 1 C specific capacity (mAh/g) | 2 C specific capacity (mAh/g) |
| Comparative Example 2 | 151.4 | 139.3 | 130.2 | 121.1 | 107.5 |
| Comparative Example 3 | 158.8 | 142.9 | 131.8 | 119.1 | 101.6 |
| Comparative Example 4 | 167.2 | 148.8 | 137.1 | 130.4 | 117.0 |
| Comparative Example 5 | 174.9 | 152.2 | 139.2 | 125.9 | 115.4 |
| Comparative Example 6 | 160.8 | 158.2 | 156.3 | 151.3 | 141.6 |
| Comparative Example 7 | 172.4 | 169.8 | 166.2 | 163.3 | 148.3 |
| Comparative Example 8 | 153.8 | 140.0 | 127.7 | 118.4 | 104.6 |
| Comparative Example 9 | 168.6 | 146.7 | 134.9 | 128.1 | 116.3 |
| Example 3 | 161.0 | 159.4 | 157.0 | 153.0 | 142.5 |
| Example 4 | 168.5 | 166.0 | 163.9 | 160.8 | 146.6 |
| Example 5 | 160.6 | 158.2 | 155.8 | 152.9 | 143.3 |
| Example 6 | 167.9 | 165.5 | 163.0 | 159.7 | 148.6 |
| Example 7 | 160.5 | 158.0 | 155.7 | 152.6 | 143.1 |
| Example 8 | 168.0 | 165.4 | 163.1 | 159.5 | 148.5 |
| Example 9 | 160.1 | 157.8 | 155.4 | 152.3 | 142.8 |
| Example 10 | 167.9 | 165.7 | 163.2 | 159.8 | 148.8 |
| Example 11 | 160.0 | 157.6 | 155.3 | 152.1 | 142.7 |
| Example 12 | 168.0 | 165.5 | 163.1 | 159.6 | 148.6 |
| Example 13 | 173.9 | 171.6 | 169.0 | 165.7 | 152.7 |
| Example 14 | 180.5 | 178.9 | 174.9 | 171.1 | 157.2 |
| Example 15 | 172.8 | 171.2 | 167.4 | 165.0 | 153.8 |
| Example 16 | 180.6 | 179.3 | 174.3 | 169.6 | 159.8 |
| Example 17 | 173.3 | 171.2 | 168.3 | 165.2 | 152.8 |

TABLE 1-continued

| | Rate performance test results of Comparative Example 2 to Comparative Example 9 and Example 3 to Example 19 | | | | |
|---|---|---|---|---|---|
| | 0.1 C specific capacity (mAh/g) | 0.2 C specific capacity (mAh/g) | 0.5 C specific capacity (mAh/g) | 1 C specific capacity (mAh/g) | 2 C specific capacity (mAh/g) |
| Example 18 | 180.8 | 179.5 | 174.4 | 168.9 | 158.9 |
| Example 19 | 159.5 | 156.9 | 154.4 | 151.2 | 142.0 |

TABLE 2

| | Cycle performance test results of Comparative Example 2 to Comparative Example 9 and Example 3 to Example 19 | | |
|---|---|---|---|
| Example | First-cycle specific capacity (mAh/g) | Specific capacity after 100 cycles (mAh/g) | Capacity retention rate |
| Comparative Example 2 | 129.1 | 72.6 | 56.2% |
| Comparative Example 3 | 127.2 | 65.9 | 51.8% |
| Comparative Example 4 | 133.2 | 80.1 | 60.1% |
| Comparative Example 5 | 134.5 | 71.8 | 53.4% |
| Comparative Example 6 | 153.6 | 111.2 | 72.4% |
| Comparative Example 7 | 162.9 | 121.4 | 74.5% |
| Comparative Example 8 | 122.6 | 55.3 | 45.1% |
| Comparative Example 9 | 129.6 | 62.5 | 48.2% |
| Example 3 | 155.3 | 136.7 | 88.0% |
| Example 4 | 162.3 | 138.0 | 85.1% |
| Example 5 | 154.2 | 134.6 | 87.3% |
| Example 6 | 161.5 | 136.6 | 84.6% |
| Example 7 | 154.3 | 134.3 | 87.0% |
| Example 8 | 161.8 | 136.7 | 84.5% |
| Example 9 | 153.9 | 133.6 | 86.8% |
| Example 10 | 161.7 | 136.4 | 84.4% |
| Example 11 | 153.8 | 133.6 | 86.9% |
| Example 12 | 161.9 | 135.9 | 83.9% |
| Example 13 | 167.3 | 144.2 | 86.2% |
| Example 14 | 173.3 | 147.0 | 84.8% |
| Example 15 | 164.9 | 141.5 | 85.8% |
| Example 16 | 172.6 | 144.8 | 83.9% |
| Example 17 | 165.1 | 141.8 | 85.9% |
| Example 18 | 172.8 | 144.9 | 83.9% |
| Example 19 | 153.4 | 133.0 | 86.7% |

It can be learned through comparison among Example 3, Example 5, Example 7, Example 9, and Example 11, and Comparative Example 2 (or comparing Example 4, Example 6, Example 8, Example 10, and Example 12, and Comparative Example 3, or comparing Example 13, Example 15, and Example 17, and Comparative Example 4, or comparing Example 14, Example 16, and Example 18, and Comparative Example 5) that in the lithium-ion battery, if non-coated $Li_5FeO_4$ was added, regardless of whether the positive active material was $LiCoO_2$ or $LiNi_{0.5}Co_{0.2}Mn_{0.3}O_2$, the rate performance and the cycle performance were very poor.

For Comparative Example 2 and Comparative Example 3 in which the positive active material was $LiCoO_2$, in Comparative Example 2, 3 wt % $Li_5FeO_4$ was added, based on a 0.1 C discharge capacity, discharge capacity retention rates were 92%, 86%, 80%, and 71% at 0.2 C, 0.5 C, 1 C, and 2 C respectively, and after 100 cycles at 0.5 C, the capacity retention rate was only 56.2%. In Comparative Example 3, 5 wt % $Li_5FeO_4$ was added, and rate performance and cycle performance were further deteriorated. Based on a 0.1 C discharge capacity, discharge capacity retention rates were 90%, 83%, 75%, and 64% at 0.2 C, 0.5 C, 1 C, and 2 C respectively; and after 100 cycles at 0.5 C, the capacity retention rate was only 51.8%.

Similarly, for Comparative Example 4 and Comparative Example 5 in which the positive active material was $LiNi_{0.5}Co_{0.2}Mn_{0.3}O_2$, in Comparative Example 4, 2 wt % $Li_5FeO_4$ was added, based on a 0.1 C discharge capacity, discharge capacity retention rates were 89%, 82%, 78%, and 70% at 0.2 C, 0.5 C, 1 C, and 2 C respectively, and after 100 cycles at 0.5 C, the capacity retention rate was only 60.1%. In Comparative Example 5, 4 wt % $Li_5FeO_4$ was added, and rate performance and cycle performance were also further deteriorated. Based on a 0.1 C discharge capacity, discharge capacity retention rates were 87%, 80%, 72%, and 66% at 0.2 C, 0.5 C, 1 C, and 2 C respectively, and after 100 cycles at 0.5 C, the capacity retention rate was only 53.4%.

It can be learned that if $Li_5FeO_4$ was added as the positive electrode lithium supplementing material, $Li_5FeO_4$ could only exert a gram capacity of approximately 300 mAh/g to 350 mAh/g (as shown in FIG. 5), and the rate performance and cycle performance of lithium-ion batteries were poor. This was because electrical conductivity of $Li_5FeO_4$ and its delithiation product was extremely poor. When an amount of the added $Li_5FeO_4$ increased, the rate performance of the lithium-ion batteries was deteriorated more significantly. As the cycle proceeded, there were more by-products, and the delithiation product of $Li_5FeO_4$ also partially dissolved, which severely limited cycle stability of the lithium-ion batteries.

In contrast, after the semiconductor oxide-coated $Li_5FeO_4$ was added to the lithium-ion battery, $Li_5FeO_4$ could exert a gram capacity of approximately 600 mAh/g or more (as shown in FIG. 3 and FIG. 4), and exertion of the gram capacities of $LiCoO_2$ and $LiNi_{0.5}Co_{0.2}Mn_{0.3}O_2$ was not affected. According to the examples, it could be learned that regardless of whether the coating material was indium oxide, indium tin oxide, or antimony tin oxide, the rate performance and cycle performance of the lithium-ion batteries were significantly improved.

Figure 6:
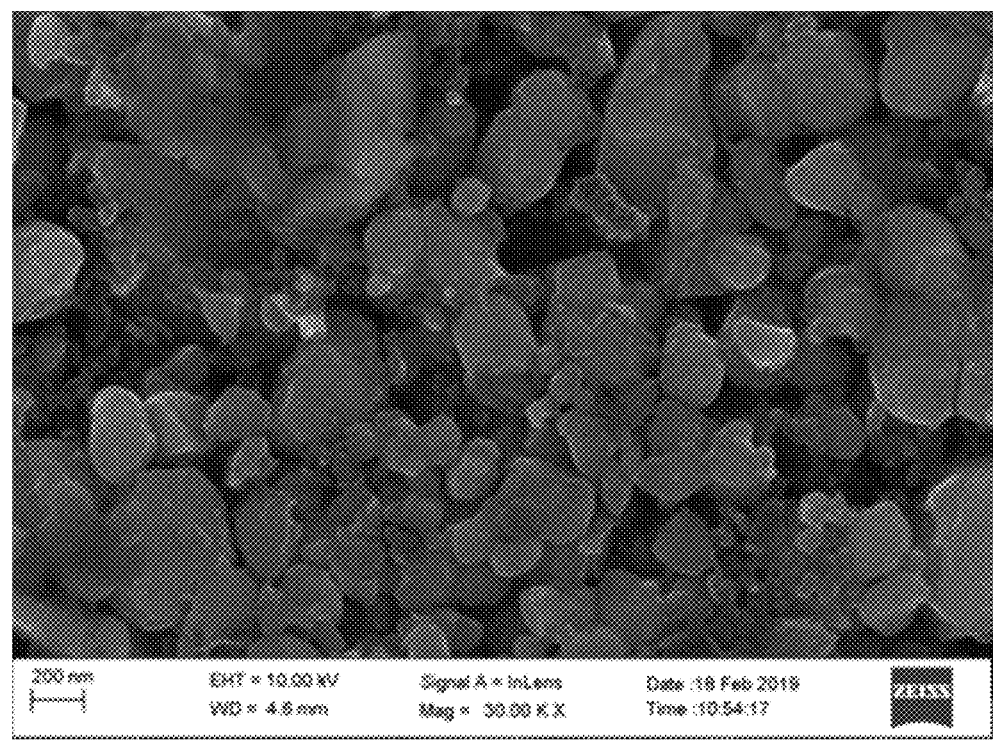
FIG. 6 is an SEM diagram of indium oxide-coated $Li_5FeO_4$ after the first cycle of delithiation in Example 1.

For Example 3 to Example 12 in which the positive active material was $LiCoO_2$, for example, in Example 3, 3 wt % indium oxide-coated $Li_5FeO_4$ was added, based on a 0.1 C discharge capacity, discharge capacity retention rates were 99%, 97.5%, 95%, and 88.5% at 0.2 C, 0.5 C, 1 C, and 2 C respectively, and after 100 cycles at 0.5 C, the capacity retention rate could be increased to 88%. As shown in Table 1 and Table 2, the same conclusion could be obtained from Example 13 to Example 18 in which the positive active material was $LiNi_{0.5}Co_{0.2}Mn_{0.3}O_2$. The fundamental reason was that $Li_5MO_4$ was coated with the semiconductor oxide, which significantly improved electronic conductance of the delithiated product of the lithium supplementing material. As shown in FIG. 6, after the lithium supplementing material (the indium oxide-coated $Li_5FeO_4$) was charged and delithiated in the first cycle, the semiconductor oxide still formed a relatively uniform coating layer around its particles. To be specific, adding the semiconductor oxide-coated positive electrode lithium supplementing material of this application could significantly improve the rate performance and cycle performance of the lithium-ion batteries.

Through comparison among Example 3, Example 5, Example 7, Example 9, and Example 11, and Comparative Example 6 (or comparing Example 13, Example 15, and Example 17, and Comparative Example 7), it could be learned from the rate performance test results in Table 1 that, coating $Li_5FeO_4$ with the semiconductor oxide or the conductive carbon could improve the rate performance of the batteries. This was mainly because both the semiconductor oxide and the conductive carbon could reduce polarization between the positive electrode lithium supplementing material particles, which was conducive to exerting the capacities of lithium-ion batteries during high-current discharge. In addition, however, it could be learned from the cycle performance test results shown in Table 2 that, the cycle performance of the semiconductor oxide-coated positive electrode lithium supplementing materials in Examples was significantly better than that of the conductive carbon-coated positive electrode lithium supplementing materials in Comparative Examples. This was mainly because the semiconductor oxide was not sensitive to an external environment such as heat and humidity, and could withstand high-pressure oxidation and maintain excellent permanent electrical conductivity. The conductive carbon had a risk of being partially oxidized in cycling, which was not conducive to long-term cycling at a high voltage.

Through comparison among Example 3, Example 5, Example 7, Example 9, and Example 11, and Comparative Example 8 (or comparing Example 13, Example 15, and Example 17, and Comparative Example 9), it could be learned from the results shown in Table 1 and Table 2 that, if $Li_5FeO_4$ was directly applied on the surface of the positive active material, both the rate performance and the cycle performance of the prepared lithium-ion battery were relatively poor. This was mainly because the $Li_5FeO_4$ on the surface would form a product layer with poor electrical conductivity in situ after delithiation that covered the surface of the positive active material, which hindered migration of $Li^+$ and increased the polarization of the lithium-on batteries.

Through comparison among Example 3 and Example 19, it could be learned that if the indium oxide-coated $Li_5MO_4$ material was used, regardless of whether the $Li_5MO_4$ material was $Li_5FeO_4$ or $Li_5AlO_4$, the cycle performance and the rate performance of the lithium-ion batteries were roughly the same, indicating that the semiconductor oxide coating different types of anti-fluorite lithium supplementing materials could achieve relatively great results.

In conclusion, the lithium supplementing material of this application can not only effectively increase the energy density of electrochemical apparatus such as the lithium-ion battery, but also improve rate performance and cycle stability, and therefore has broad application prospects.

References to "some embodiments", "an embodiment", "another example", "examples", "specific examples", or "some examples" in the specification mean the inclusion of specific features, structures, materials, or characteristics described in the embodiment or example in at least one embodiment or example of this application. Accordingly, descriptions appearing in the specification, such as "in some embodiments", "in the embodiments", "in an embodiment", "in another example", "in an example", "in a particular example", or "for example", are not necessarily references to the same embodiments or examples in this application. In addition, specific features, structures, materials, or characteristics herein may be incorporated in any suitable manner into one or more embodiments or examples.

Although illustrative embodiments have been demonstrated and described, those skilled in the art should understand that the above embodiments are not to be construed as limiting this application, and that the embodiments may be changed, replaced, and modified without departing from the spirit, principle, and scope of this application.

What is claimed is:

1. A positive electrode, comprising: a positive active material, a conductive agent, a binder, and a lithium supplementing material; wherein the lithium supplementing material comprises $Li_5MO_4$ and a semiconductor oxide on a surface thereof, wherein M comprises at least one of Fe, Ni, Mn, Ru, Cr, Cu, Nb, Al, or Mo;

wherein the semiconductor oxide is one of indium tin oxide or antimony tin oxide;

wherein in a case where the semiconductor oxide is the indium tin oxide, a molar ratio of tin to indium in the semiconductor oxide is 0.1:1 to 0.5:1; and wherein in a case where the semiconductor oxide is antimony tin oxide, a molar ratio of antimony to tin in the semiconductor oxide is 0.1:1 to 0.5:1.

2. The positive electrode according to claim 1, wherein the positive active material comprises at least one of lithium cobaltate, lithium iron phosphate, lithium iron manganese phosphate, lithium vanadium phosphate, lithium vanadyl phosphate, lithium vanadate, lithium manganate, lithium nickelate, lithium nickel cobalt manganate, a lithium-rich manganese-based material, or lithium nickel cobalt aluminate.

3. The positive electrode according to claim 1, wherein the conductive agent comprises at least one of conductive carbon black, carbon fiber, acetylene black, Ketjen black, graphene, or carbon nanotube; and the binder comprises at least one of polypropylene, polyethylene, polyvinylidene fluoride, vinylidene fluoride-hexafluoropropylene, polytetrafluoroethylene, or polyhexafluoropropylene.

4. A positive electrode, comprising: a positive active material, a conductive agent, a binder and a compound derived from delithiation of a lithium supplementing material; wherein the compound derived from delithiation of a lithium supplementing material comprises $LiMO_2$, wherein the lithium supplementing material comprises a semiconductor oxide on a surface thereof, and wherein M comprises at least one of Fe, Ni, Mn, Ru, Cr, Cu, Nb, Al, or Mo;

wherein the semiconductor oxide is one of indium tin oxide or antimony tin oxide;

wherein in a case where the semiconductor oxide is the indium tin oxide, a molar ratio of tin to indium in the semiconductor oxide is 0.1:1 to 0.5:1; and wherein in a case where the semiconductor oxide is antimony tin oxide, a molar ratio of antimony to tin in the semiconductor oxide is 0.1:1 to 0.5:1.

5. The positive electrode according to claim 4, wherein the lithium supplementing material comprises $Li_5MO_4$ having the semiconductor oxide on the surface thereof.

6. The positive electrode according to claim 4, wherein the positive active material comprises at least one of lithium cobaltate, lithium iron phosphate, lithium iron manganese phosphate, lithium vanadium phosphate, lithium vanadyl phosphate, lithium vanadate, lithium manganate, lithium nickelate, lithium nickel cobalt manganate, a lithium-rich manganese-based material, or lithium nickel cobalt aluminate.

7. The positive electrode according to claim 4, wherein the conductive agent comprises at least one of conductive carbon black, carbon fiber, acetylene black, Ketjen black, graphene, or carbon nanotube; and the binder comprises at least one of polypropylene, polyethylene, polyvinylidene fluoride, vinylidene fluoride-hexafluoropropylene, polytetrafluoroethylene, or polyhexafluoropropylene.

8. An electronic apparatus, comprising an electrochemical apparatus, the electrochemical apparatus comprises a positive electrode comprising: a positive active material, a conductive agent, a binder and a lithium supplementing material; wherein the lithium supplementing material comprises $Li_5MO_4$ and a semiconductor oxide on a surface thereof, wherein M comprises at least one of Fe, Ni, Mn, Ru, Cr, Cu, Nb, Al, or Mo;

wherein the semiconductor oxide is one of indium tin oxide or antimony tin oxide;

wherein in a case where the semiconductor oxide is the indium tin oxide, a molar ratio of tin to indium in the semiconductor oxide is 0.1:1 to 0.5:1; and wherein in a case where the semiconductor oxide is antimony tin oxide, a molar ratio of antimony to tin in the semiconductor oxide is 0.1:1 to 0.5:1.

9. An electronic apparatus, comprising an electrochemical apparatus, the electrochemical apparatus comprises the positive electrode according to claim 4.

10. The positive electrode according to claim 1, wherein the semiconductor oxide is the indium tin oxide.

11. The positive electrode according to claim 1, wherein the $Li_5MO_4$ comprises at least one of $Li_5FeO_4$ or $Li_5AlO_4$.

12. The positive electrode according to claim 1, wherein the semiconductor oxide is the antimony tin oxide.

13. The electronic apparatus according to claim 8, wherein the semiconductor oxide is the indium tin oxide.

14. The electronic apparatus according to claim 8, wherein the $Li_5MO_4$ comprises at least one of $Li_5FeO_4$ or $Li_5AlO_4$.

15. The electronic apparatus according to claim 8, wherein the semiconductor oxide is the antimony tin oxide.

16. The positive electrode according to claim 1, wherein a weight percentage of the semiconductor oxide is 0.5 wt % to 3 wt %.

17. The positive electrode according to claim 4, wherein a weight percentage of the semiconductor oxide is 0.5 wt % to 3 wt %.

18. The electronic apparatus according to claim 8, wherein a weight percentage of the semiconductor oxide is 0.5 wt % to 3 wt %.

\* \* \* \* \*